(12) United States Patent
Kato et al.

(10) Patent No.: US 6,298,283 B1
(45) Date of Patent: Oct. 2, 2001

(54) INDUSTRIAL ROBOT

(75) Inventors: Tetsuaki Kato, Hadano; Yukinobu Tsuchida, Minamitsuru-gun, both of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/472,046

(22) Filed: Dec. 27, 1999

(30) Foreign Application Priority Data

Mar. 26, 1999 (JP) .................................. 11-083094

(51) Int. Cl.$^7$ .......................... G05B 19/04; G05B 19/18
(52) U.S. Cl. .................. 700/255; 700/193; 700/245; 318/16; 318/568.2; 318/568.23; 318/560; 318/640
(58) Field of Search .................................. 700/245, 255, 700/193; 318/16, 640, 568.23, 538, 568.2, 560, 632; 323/355, 902

(56) References Cited

U.S. PATENT DOCUMENTS

| | | | |
|---|---|---|---|
| 5,119,006 | * 6/1992 | Torii et al. | 318/640 |
| 5,304,906 | * 4/1994 | Arita et al. | 318/568.16 |
| 5,440,213 | 8/1995 | Arita et al. | |
| 5,602,347 | 2/1997 | Matsubara et al. | |
| 5,656,906 | * 8/1997 | Iwashita et al. | 318/568.23 |

FOREIGN PATENT DOCUMENTS

| | | |
|---|---|---|
| 1046470-A2 | * 10/2000 | (EP) . |
| 62-140795 | 6/1987 | (JP) . |
| 3-3687 | 1/1991 | (JP) . |
| 6-245561 | 9/1994 | (JP) . |

OTHER PUBLICATIONS

Chen et al., Servo control of flexible beam with inverse–dynamics feedforward and distrubance observer, 1993, IEEE, pp. 702–707.*

Hooper, Motion coordination based on multiple performance criterial with a hyper–redundant serial robot example, 1995, IEEE, pp. 133–138.*

* cited by examiner

Primary Examiner—William A. Cuchlinski, Jr.
Assistant Examiner—McDieunel Marc
(74) Attorney, Agent, or Firm—Staas & Halsey, LLP

(57) ABSTRACT

An industrial robot capable of preventing re-collision after colliding with an obstacle. Disturbing torque exerted on each servomotor for a robot axis is estimated by its associated disturbance estimating observer. When a hand attached to an end of a robot arm collides with an obstacle, an estimated value of disturbance given by a disturbance estimating observer exceeds a predetermined threshold, and the collision is detected. Then, each motor for driving a robot arm is drivingly controlled with a velocity command turned to "0". Each motor for driving the robot hand is driven with torque having a predetermined magnitude (maximum magnitude) and the same sign as that of an estimated value of disturbing torque exerted on it, for a predetermined time, and then it is brought to an emergency stop. Thus, after colliding with an obstacle, the robot hand is driven in a direction such that it recedes from the obstacle. Therefore, the robot hand is prevented from colliding with the obstacle again, and parts of the robot, the hand and the obstacle are prevented from being damaged by collision.

12 Claims, 7 Drawing Sheets

FIG. 5b DISTURBANCE TORQUE

INDUSTRIAL ROBOT

BACKGROUND OF THE INVENTION

1. Field of the Invention

The present invention relates to an industrial robot, specifically to a technique of reducing shock when a robot collides with an obstacle and abnormal load is exerted on axes of the robot.

2. Description of the Related Art

FIG. 7 is a block diagram showing velocity loop control which is performed by servo controller for a servomotor for driving an axis of an industrial robot. A velocity deviation ε is obtained by subtracting a velocity feedback signal Vf sent from a velocity detector attached to a servomotor from a velocity command Vc outputted from a position loop control system or directly from a numerical controller. The value obtained by multiplying the integral of velocity deviation ε by an integral constant K1 (output of an integrator 100) and the value obtained by multiplying the velocity deviation ε by a proportional constant K2 (output of a proportional device 101) are added to obtain a torque command Tc. The servomotor is driven in accordance with the torque command Tc. Thus, the servomotor for driving a robot axis is generally drivingly controlled by the velocity loop control including proportional-plus-integral control.

Conventionally, in the control system as described above, when a collision of the robot with an obstacle is detected, each servomotor is drivingly controlled with a velocity command Vc turned to "0" so as to prevent damage such as breakage due to the collision.

In order to detect a collision, it can be adopted a method in which using a disturbance estimating observer 102 for estimating a disturbance torque Td based on a torque command Tc and a fed-back actual velocity Vf, it is determined that a collision has occurred when the estimated disturbance torque exceeds a predetermined value.

When a collision occurs and the velocity command Vc is turned to "0", a velocity feedback signal for the servomotor having a reversed sign is outputted to the velocity loop control system, and as a result, a torque command having a reversed sign, that is, a torque command which is to reverse the rotation of the servomotor is outputted to reduce shock due to the collision. Actually, the velocity loop system includes the integrator 100, and the influence of the integrator 100 needs to be taken into account. Here, in order to simplify the explanation, it is supposed that the influence of the integrator 100 is negligible.

FIGS. 6a to 6b are illustrations for explaining how a robot operates when a collision occurs and each servomotor is drivingly controlled with a velocity command Vc turned to "0". In FIGS. 6a to 6b, reference numeral 20 denotes an obstacle, 21 a hand attached to a wrist of the robot, and 22 an arm of the robot. Reference symbol Ma denotes a servomotor for driving the arm 22 (hereinafter referred to as "arm motor"), and reference symbol Mw denotes a servomotor for driving a wrist axis (hereinafter referred to as "wrist motor").

Suppose that the arm 22 is driven by the arm motor Ma in a direction indicated by arrow a in FIG. 6a. When an end of the hand 21 collides with the obstacle 20 as shown in FIG. 6b, the arm motor Ma continues producing torque and motor velocity having the same direction as before the collision (the counter-clockwise direction in FIG. 6b) and the hand 21 receives disturbance torque having the opposite direction (the clockwise direction in FIG. 6b) from the obstacle, as indicated in FIG. 6b.

When the collision is detected, the velocity command Vc for each motor is turned to "0". When the velocity command Vc is turned to "0", only the velocity feedback signal Vf is inputted to the velocity loop, and as a result, the torque command Tc for each motor has a direction opposite to that it had before, as described above. Thus, the torque having a direction opposite to that before, that is, the clockwise direction is produced by the arm motor as indicated in FIG. 6c, and as a result, the arm 22 and hand 21 recede from the obstacle 20 and the robot stops. However, since the hand 21 and arm 22 are pushed by repulsive force due to deflection of the obstacle caused by the collision, the arm motor has also a velocity having a direction such that the arm 22 recedes from the obstacle 20, that is, the clockwise direction, as indicated in FIG. 6c. Since that velocity is fed back to the velocity loop, the sign of the torque command Tc is reversed and toque having a direction such that the arm collides with the obstacle 20, that is, the counter-clockwise direction is produced by the arm motor Ma as indicated in FIG. 6d. Thus, a collision may occur again.

SUMMARY OF THE INVENTION

The object of the present invention is to provide an industrial robot capable of receding from an obstacle with which it has collided, without causing a re-collision.

An industrial robot of the present invention comprises servomotors for respectively driving robot axes including wrist axes and servo controllers each having a speed loop to drivingly control each of the servomotors. When a collision of a robot or an end effector mounted on the robot with an obstacle is detected, the servo controllers for servomotors for driving the wrist axes drive the associated servomotors for a predetermined time period in a direction opposite to the direction of torque generated at the time of the collision. Further, when the collision is detected, the servo controllers for servomotors for driving the axes other than the wrist axes may stop the associated servomotors.

According to the present invention, it is determined that a collision has occurred between a robot or an end effector mounted on the robot and an obstacle when a disturbance torque exerted on any of the servomotors exceeds a predetermined threshold value. When a collision is detected in that manner, the servo controllers for servomotors for driving the wrist axes drive the associated servomotors for a predetermined time period in a direction to reduce the disturbance torque. Further, when the collision is detected, the servo controllers for servomotors for driving the axes other than the wrist axes may stop the associated servomotors. The disturbance torque can be estimated by a disturbance estimating observer. In this case, the servo controllers for servomotors for driving the wrist axes issue torque commands to the associated servomotors to generate torque in the same direction with that of the disturbance torque. The absolute value of the torque command may be predetermined or the torque command may be set to the same value with that of the disturbance torque.

BRIEF DESCRIPTION OF THE DRAWINGS

FIGS. 5a–5c are illustrations for explaining how the robot of the present invention operates when a collision has occurred;

DETAILED DESCRIPTION OF THE PREFERRED EMBODIMENTS

Figure 1:
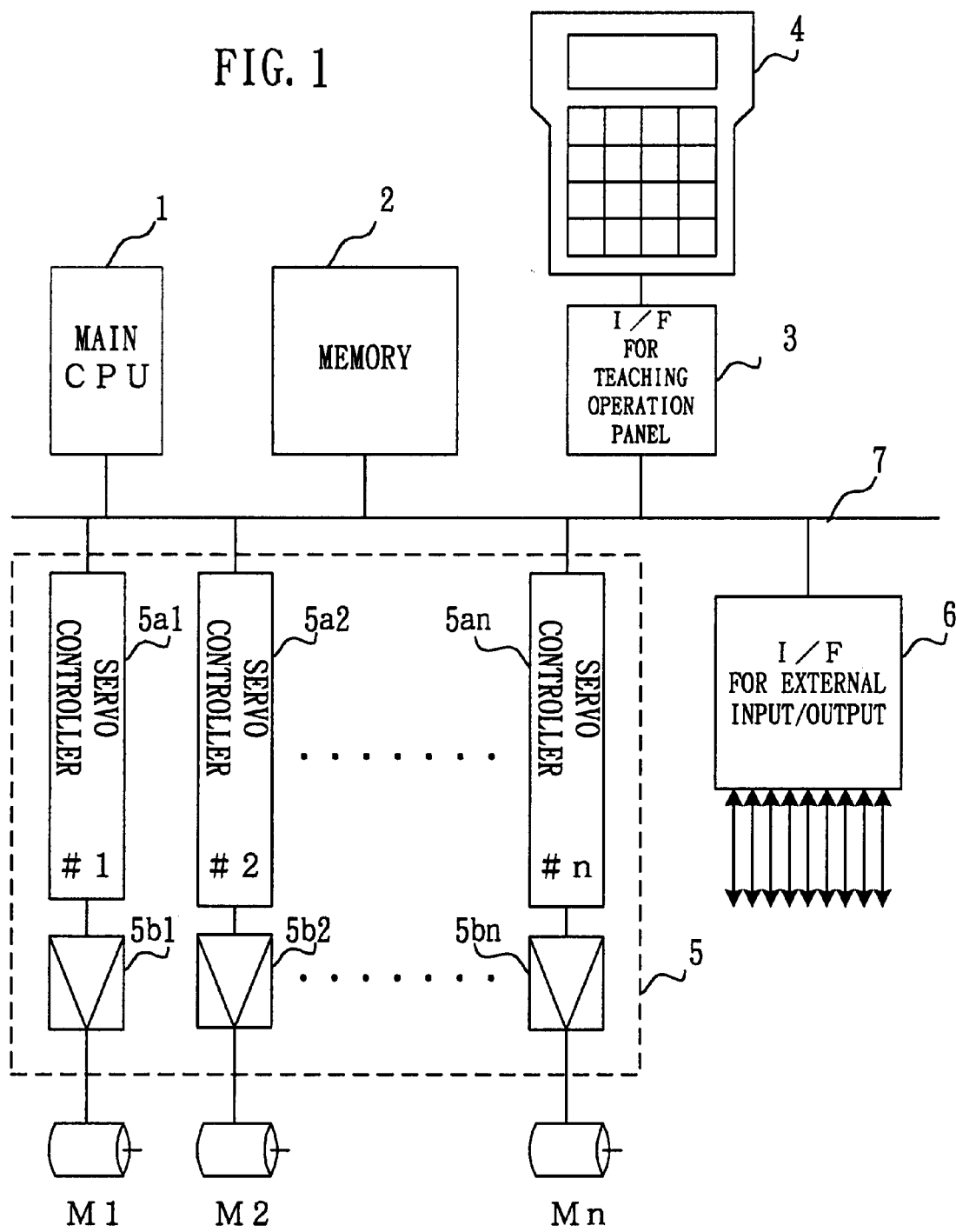
FIG. 1 is a schematic block diagram showing a robot controller for use in the present invention.

FIG. 1 is a schematic block diagram showing a principal part of a robot controller for use in embodiments of the present invention. To a bus denoted by reference numeral 7 are connected a main processor (hereinafter referred to simply as "processor") 1, a memory 2 composed of a RAM, a ROM and a nonvolatile memory (such as an EEPROM, an interface 3 for a teaching operating panel, an interface 6 for external devices, and a servo control section 5. To the interface 3 for a teaching operating panel is connected a teaching operating panel 4.

System programs for supporting basic functions of the robot and robot control system are stored in the ROM of the memory 2. Robot operation programs and their related determined data which are taught in accordance with applications are stored in the nonvolatile memory of the memory 2. The RAM of the memory 2 is used as a memory for temporarily storing data for various operations performed by the processor 1.

The servo control section 5 comprises servo controllers 5a1 to 5an (n: sum of the number of all the axes of the robot including movable axes of a tool attached to a wrist of the robot) each composed of a processor, a ROM, a RAM and the like. Each servo controller performs position/velocity loop control of its associated servomotor for driving an axis, and current loop control. It is a so-called digital servo controller which performs loop control of position, velocity and current by software. Each servomotor M1–Mn for driving an axis is drive-controlled in accordance with the output of its associated servo controller 5a1–5an through its associated servo amplifier 5b1–5bn. Though not shown in FIG. 1, a position/velocity detector is attached to each servomotor M1–Mn, and the position and velocity of each servomotor detected by its associated position/velocity detector is fed back to its associated servo controller 5a1–5an. To the input/output interface 6 are connected sensors in the robot and actuators and sensors of peripheral devices.

The above basic structure of the robot controller is in no way different from that of a conventional robot controller. According to the present invention, the robot control system as described above is arranged such that when a hand or the like of an end effector attached to a wrist of the robot collides with an obstacle, the robot is driven in a direction such that the end effector recedes from the obstacle, to thereby prevent re-collision and reduce damage due to the collision to the minimum.

Figure 2:
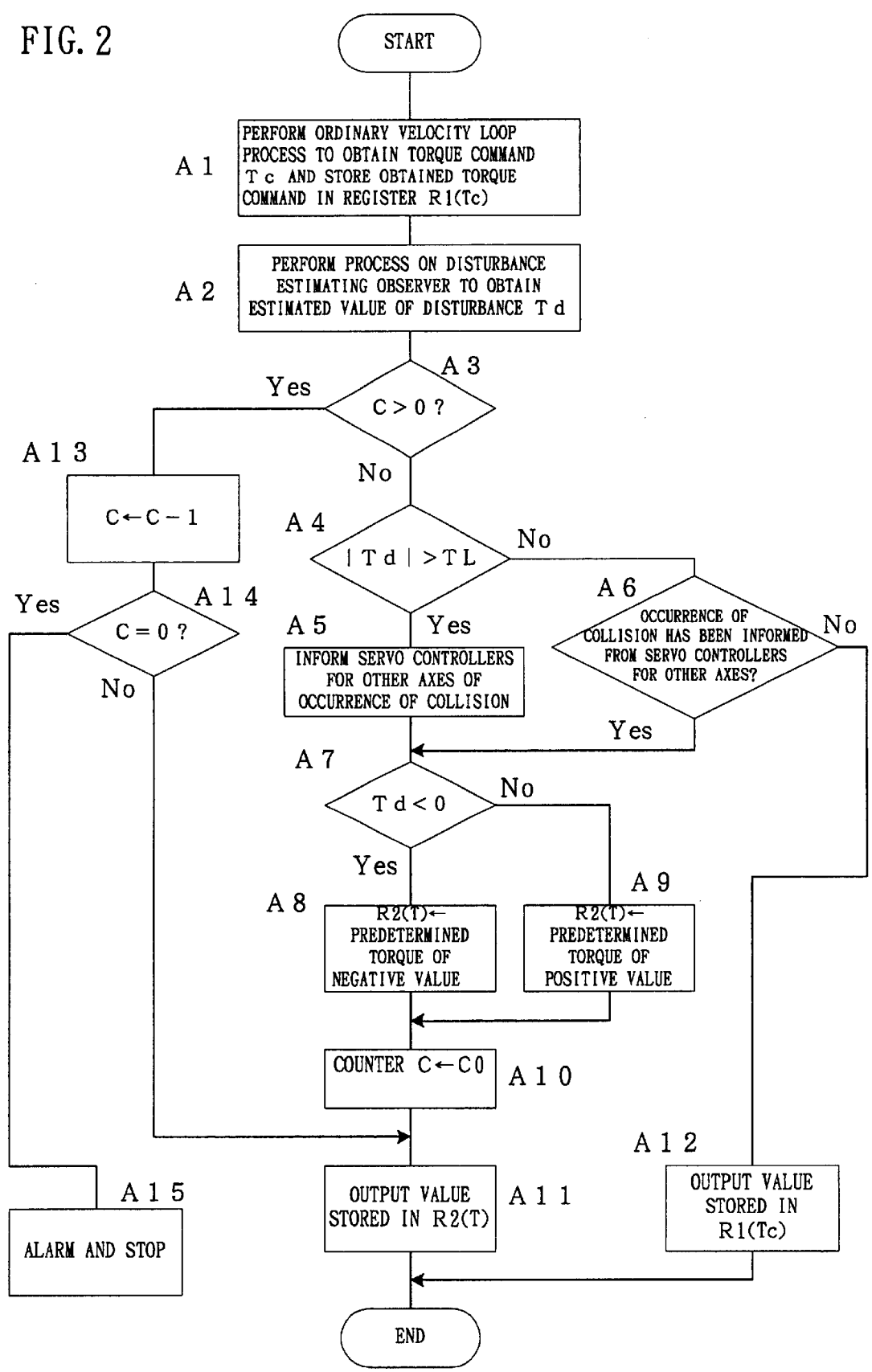
FIG. 2 is a flowchart of a process to be executed by a processor in a servo controller for drivingly controlling a servomotor for driving a wrist axis in a first embodiment in each predetermined period.

FIG. 2 is a flowchart of a process which each servo controller for drive-controlling a servomotor for driving robot wrist axis in the servo control section 5 performs in each period of velocity loop process in order to detect collision and prevent re-collision.

The processor of a servo controller for driving a robot wrist axis first performs an ordinary velocity loop process to obtain a torque command Tc. Specifically, the processor performs a velocity loop control process including the above-described proportional-plus-integral control or the like based on a move command delivered from the main processor 1 and a velocity feedback signal sent from a velocity detector attached to a servomotor associated with the present servo controller (or a movable part driven by the servomotor) to thereby obtain a torque command Tc, and enters the torque command Tc in a register R1(Tc) (Step A1). Then the processor performs a process relating to its associated disturbance estimating observer to obtain an estimated value of disturbance Td (Step A2). Next, the processor judges whether a counter C for measuring the time for receding the robot after a collision is detected indicates a value larger than "0" (Step A3). It is to be noted that the counter C is initially arranged to indicate "0". If the counter C indicates "0", the processor judges whether the absolute value of the estimated value of disturbance Td obtained in Step A2 exceeds a predetermined threshold TL (Step A4) to detect an occurrence of a collision. Since the process relating to the disturbance estimating observer is already known in the art as disclosed in U.S. Pat. Nos. 5,304,906; 5,440,213; 5,602,347 etc., the explanation thereof will be omitted.

If the absolute value of the estimated value of disturbance Td given by the disturbance estimating observer does not exceed the threshold, it means that large load is not exerted on the servomotor for driving a wrist axis associated with the present servo controller and that a collision has not occurred. In that case, the processor goes from Step A4 to Step A6, and judges whether information that a collision has been detected has been transmitted from another jointed axis of the robot. If not, the processor delivers to the current loop the torque command Tc obtained in Step A1 and stored in the register R1(Tc) (Step A12). Thus, the processor finishes the process in the present period of velocity loop process.

Then, as long as collision is not detected and the counter C indicates "0", the processor of the present servo controller for driving a wrist axis performs Steps A1, A2, A3, A4, A6 and A12 in each period and drive-control its associated servomotor.

If the end effector collides with an obstacle, the end effector cannot move, but the wrist axes and other axes such as arm axes for moving the wrist continue to be driven and the end effector is pressed against the obstacle. Since the end effector tries to keep or move to its designated position, disturbance torque is exerted on the servomotors for driving the wrist axes. The disturbance torque exerted on each servomotor for driving a wrist axis is estimated in Step A2, that is, in the process relating to its associated disturbance estimating observer. If the absolute value of the estimated value Td exceeds the predetermined threshold TL and a collision is detected in Step A4, the processor transmits to the other axes, that is, the other wrist axes and the jointed axes of the robot other than the wrist axes (those jointed axes of the robot other than the wrist axes will be hereinafter referred to as "basic axes") information that a collision has occurred (Step A5). When the processor detects a collision in the above manner or when the processor receives from another robot axis the information that a collision has occurred (Step A6), the processor judges the sign of the estimated value of disturbance Td obtained in Step A2 (Step A7). If the sign is negative, the processor enters a predetermined negative value of torque in a register R2(T) (Step A8), and if the sign is positive, the processor enters a predetermined positive value of torque in the register R2(T) (Step A8). In the present embodiment, the above predetermined negative and positive values of torque are the values of the maximum torque in the negative and positive directions that each servomotor for a wrist axis can produce.

Next, the processor enters a predetermined value C0 in the counter C for measuring the time for driving its associated servomotor for a wrist axis in a direction such that the end effector recedes from the obstacle (Step A10), and delivers to the current loop the predetermined value of torque stored in the register R2(T)(Step A11). Thus, the processor finishes the process in the present period.

From the next period, since the value in the counter C is not "0", the processor goes, after performing Steps A1 and A2, from Step A3 to Step A13. The process decreases the value in the counter C by "1" (Step A13) and judges whether the present value in the counter C is "0" (Step A14). If it is not "0", the processor delivers to the current loop the predetermined value of torque stored in the register R2(T). Then, until the value in the counter reaches "0", the processor repeats Steps A1, A2, A3, A13, A14 and A11, thereby continuing to deliver the predetermine value of torque to the current loop to make the end effector recede from the obstacle.

When the value in the counter reaches "0", the processor goes from Step A14 to Step A15, sends an alarm signal and brings the robot to an emergency stop.

Figure 3:
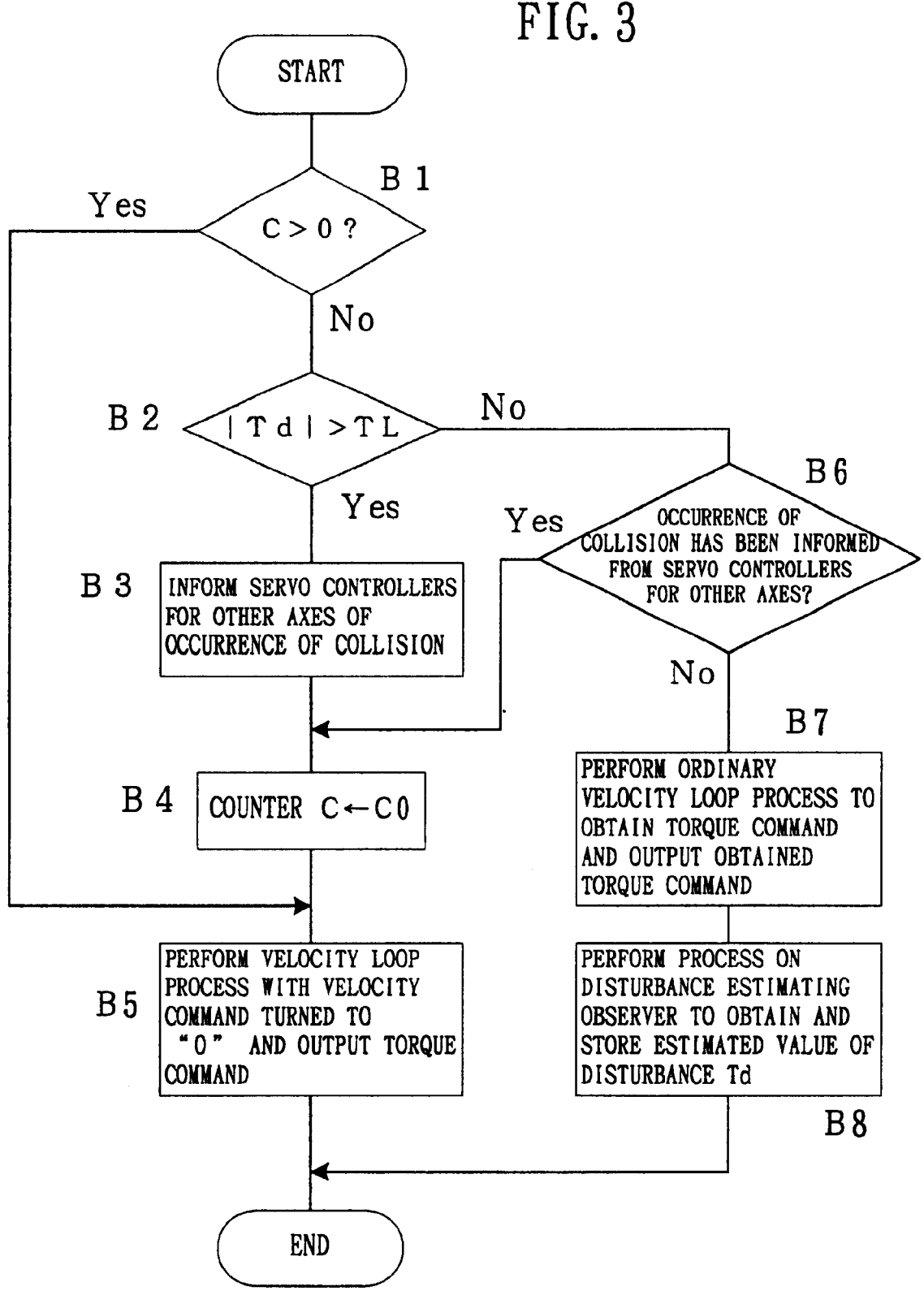
FIG. 3 is a flowchart of a process to be executed by a processor in a servo controller for drivingly controlling a servomotor for driving an axis other than wrist axes in the first embodiment in each predetermined period.

FIG. 3 is a flowchart of process which each servo controller for drive-controlling a servomotor for driving a basic axis, that is, a jointed axis of the robot other than the wrist axes perform in each period of velocity loop process. The processor of a servo controller for driving a basic axis first judges whether the present value in a counter, in which a predetermined value C0 is entered when a collision is detected, is positive (Step B1). If a collision has not occurred and the counter indicates "0", the processor judges whether the absolute value of an estimated value of disturbance Td which has been obtained and stored in the preceding period in the process relating to a disturbance estimating observer attached to a servomotor associated with the present servo controller exceeds a predetermined threshold TL (Step B2). If not, the processor judges whether information that a collision has occurred has been transmitted from a servo controller for another robot axis (Step B6). When the processor has not detected a collision nor received from another axis the information that a collision has occurred, the processor performs an ordinary velocity loop process to obtain a torque command, and delivers the torque command to the current loop (Step B7). Then, the processor performs the process relating to its associated disturbance estimating observer to obtain and store an estimated value of disturbance Td (Step B8). Thus, the processor finishes the process in the present period.

It is to be noted that in the velocity loop process, if position control is performed, a torque command is obtained by proportional-plus-integral control or the like based on a velocity command delivered from a position loop control system. If position control is not performed, a torque command is obtained by proportional-plus-integral control or the like based on a velocity command delivered from the main processor 1 and a feedback signal sent from a velocity detector for detecting rotational velocity of a servomotor in question (or a traveling velocity of a movable part driven by the servomotor).

If in Step B2, the absolute value of the estimated value of disturbance Td exceeds the predetermined threshold TL and therefore a collision is detected, the processor transmits to the other robot axes information that a collision has occurred (Step B3), enters the predetermined value C0 in the counter C (Step B4), performs the velocity loop process with a velocity command turned to "0" to obtain a torque command, and delivers the torque command to the current loop (Step B5). Even when the absolute value of the estimated value of disturbance Td exerted on the axis associated with the present servo controller does not exceed the predetermined threshold TL and therefore a collision is not detected, if the processor receives, in Step B6, from another robot axis, information that a collision has occurred, the processor goes from Step B6 to Step B4, enters the predetermined value C0 in the counter C, performs the velocity loop process with a velocity command turned to "0" to obtain a torque command, and delivers the torque command to the current loop to drive-control its associated servomotor. In the succeeding period, since the value in the counter C is not "0", the processor goes from Step B1 to Step B5, obtains a torque command with a velocity command turned to "0" and delivers the torque command.

As described above, in the process of controlling a servomotor for driving a wrist axis, a processor associated with a servomotor for driving a wrist axis immediately acknowledges a collision not only when a collision is detected in the process relating to its associated disturbance estimating observer based on the fact that the absolute value of an estimated value of load torque Td exerted on its associated servomotor exceeds a predetermined threshold TL (Steps A4, A5), but also when a collision is detected in the process relating to another disturbance estimating observer associated with control of another servomotor for driving another wrist axis or a basic axis (Step A6). In other words, the processor immediately acknowledges a collision when in the process of controlling any one servomotor for driving an axis, it is found that the absolute value of an estimated value given by a disturbance estimating observer exceeds a predetermined threshold.

When a collision is detected, a processor associated with a servomotor for driving a wrist axis delivers a torque command having a predetermined magnitude (maximum magnitude) and the same sign (direction) as that of the value of disturbing torque Td estimated when the collision is detected. On the other hand, a processor associated with a servomotor for driving not a wrist axis but a basic axis performs the velocity loop process with a velocity command turned to "0" to obtain a torque command.

In the above-described example, in the process of controlling a servomotor for a basic axis, the velocity loop process is performed with a velocity command turned to "0" to obtain a torque command in Step B5, but it may be alternatively so arranged that simply a torque command is turned to "0" without performing the velocity loop process.

Further, in the above-described example, a counter C is provided for each axis, but a counter C may be only provided for any one axis. For example, a counter C is only provided for one wrist axis. It is not provided for the other axes. In the process of controlling servomotors associated with those other axes, their associated processors each refer to the counter provided for one wrist axis to perform Step A3 or B1. Alternatively, a flag is may be provided instead of a counter. In that case, the processors associated with the above other axes are each arranged to set up a flag when they detect a collision so that Step A3 or B1 may be performed based on the flag. It is to be noted that in the process of controlling servomotors associated with wrist axes not provided with a counter C, their associated processors each go from Step A3 to Step A11 in the flowchart of FIG. 2.

Furthermore, in the above embodiment, a collision is judged based on an estimated value of disturbing torque exerted on a servomotor which is obtained by a disturbance estimating observer. However a collision may be detected not using a disturbance estimating observer but based on the magnitude of a signal sent from a sensor provided for measuring power of collision.

Figure 5A:
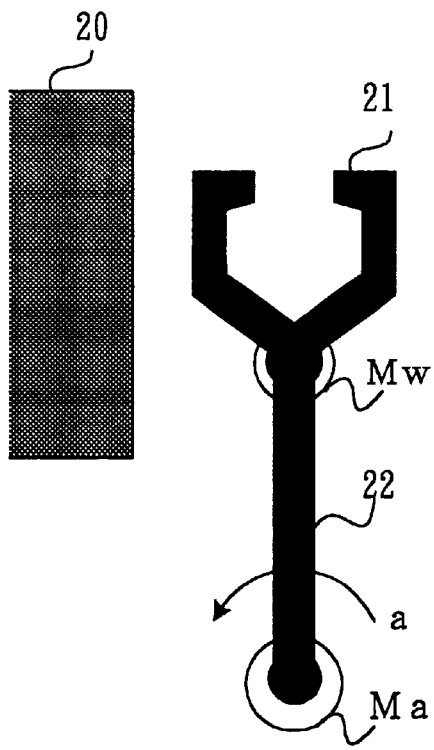
Figure 5A:
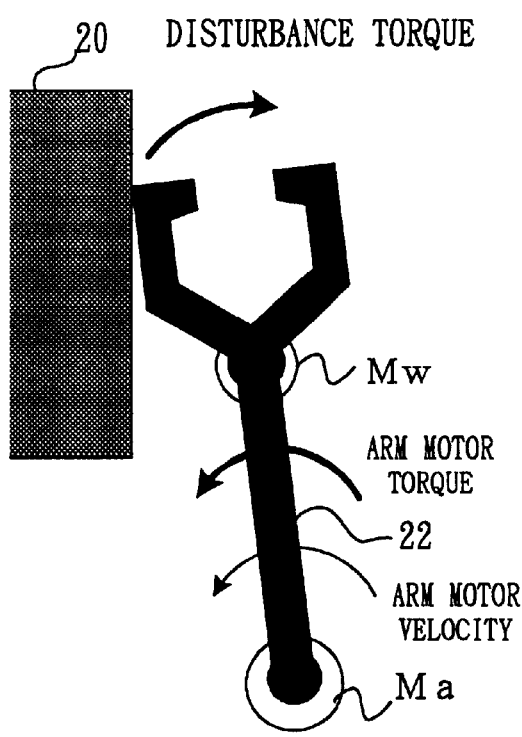
Figure 5C:
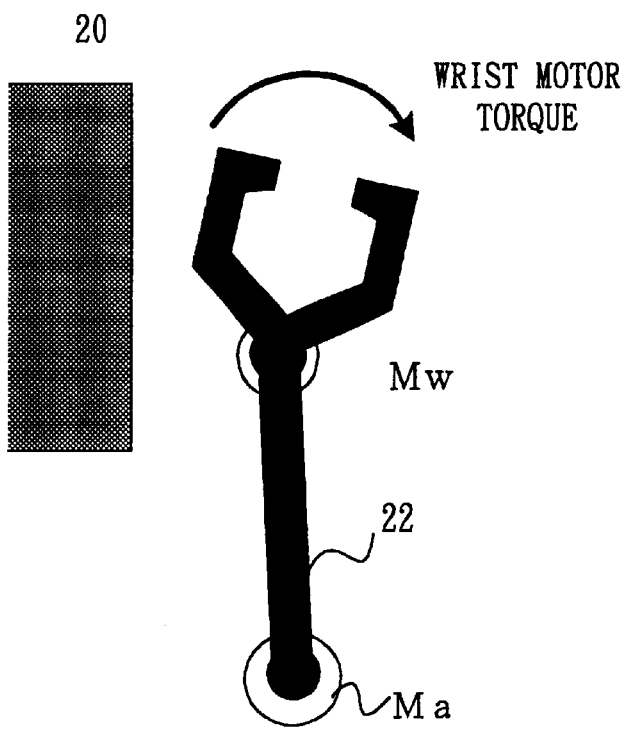
Figure 6A:
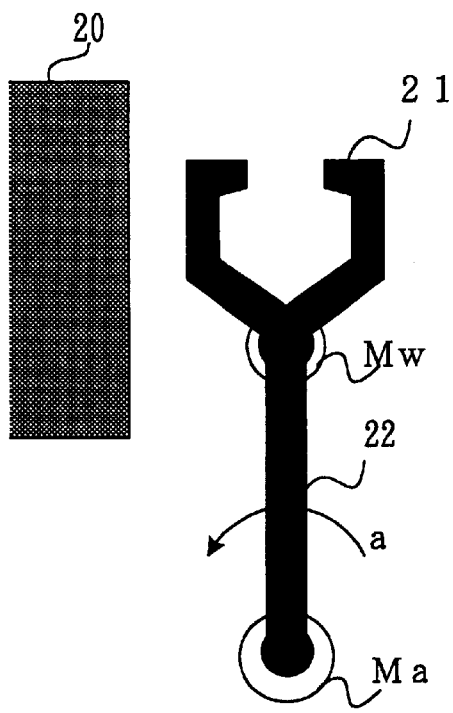
FIGS. 6a–6d are illustrations for explaining how a conventional robot operates when a collision has occurred.
Figure 6B:
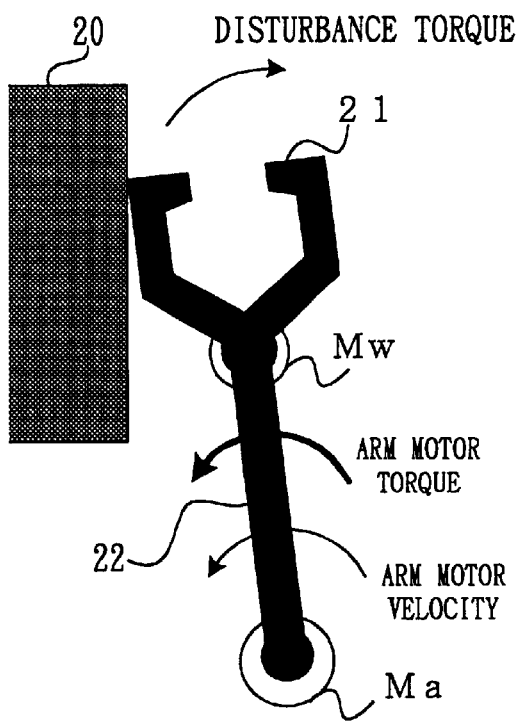
Figure 6C:
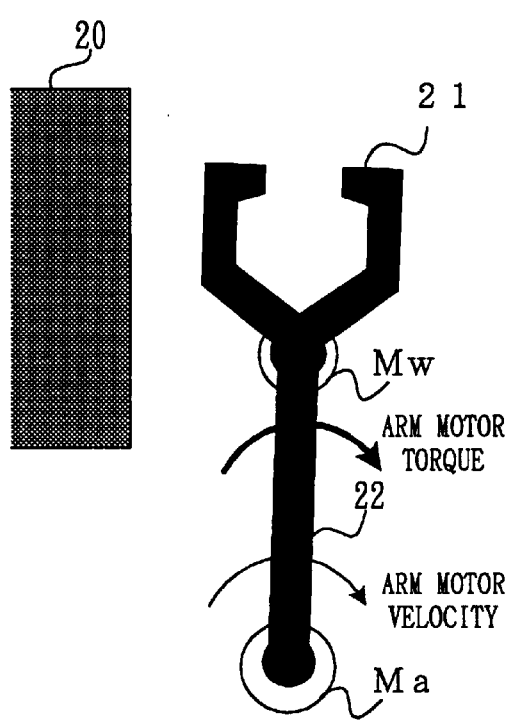
Figure 6D:
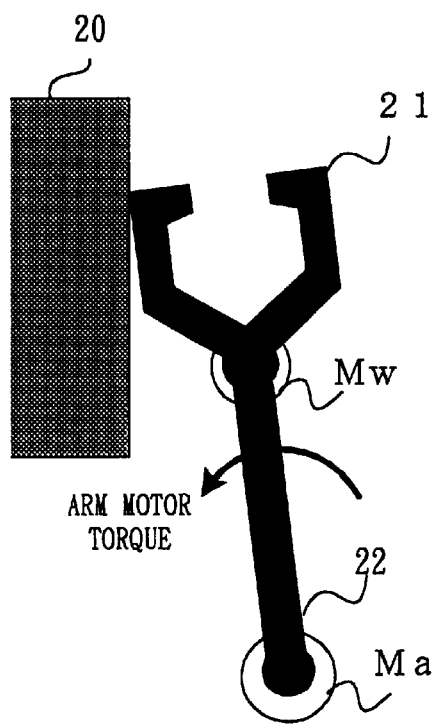
Figure 7:
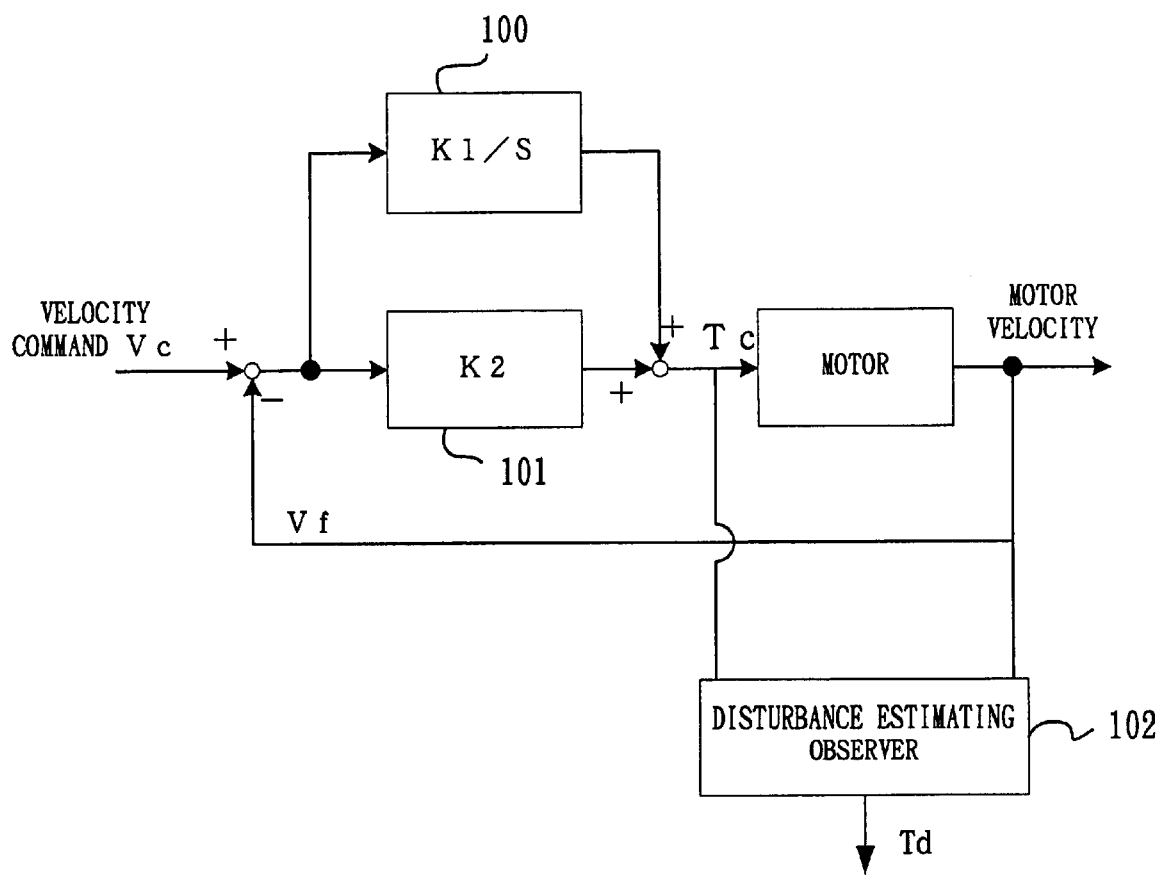
FIG. 7 is a schematic diagram for explaining velocity loop control for a servomotor.

How the robot operates in the above embodiment will be described referring to FIGS. 5a to 5c and in comparison with a conventional case shown in FIG. 6a. Suppose that an arm 22 is driven in a direction denoted by arrow a as shown in FIG. 5a by an arm motor Ma which belongs among servomotors for basic axes. When an end of a hand 21 collides with an obstacle as shown in FIG. 5b, the arm motor Ma continues producing torque and motor velocity having the same direction as before (the counter-clockwise direction as viewed in FIG. 5b) and the hand 21 receives, from the obstacle, disturbance torque having the opposite direction (the clockwise direction as viewed in FIG. 5b), as indicated in FIG. 5b. The disturbance torque is exerted on a servomotor Mw for driving a wrist axis and a servomotor Ma for a basic axis (arm motor). It influences an estimated value of disturbance Td obtained in Step A2 in FIG. 2 or Step B8 in FIG. 3, that is, it increases the absolute value of Td.

If it is judged in Step A4 or B2 that the absolute value of an estimated value of disturbance Td exerted on any servomotor for an axis exceeds a predetermined value TL and therefore a collision is detected, information that a collision has occurred is transmitted to all the other axes (Step A5, B3). For each wrist axis, a torque command having a predetermined magnitude and the same sign as that of the estimated value of disturbance exerted on it is delivered (Steps A7 to A11). For each basic axis, a torque command obtained by the velocity loop process performed with a velocity command turned to "0" is delivered (Step B5). As a result, the hand 21 is driven to recede from the obstacle 20 as indicated in FIG. 5c, and prevented from colliding with the obstacle again.

The above-described embodiment is arranged such that when a collision is detected, each servomotor for driving a wrist axis is driven by a torque command having a predetermined magnitude (maximum magnitude) and the same sign as that of the value of disturbance estimated when the collision is detected. Alternatively, a torque command for each servomotor for driving a wrist axis may be the same as the estimated value of disturbance Td given by its associated disturbance estimating observer.

Figure 4:
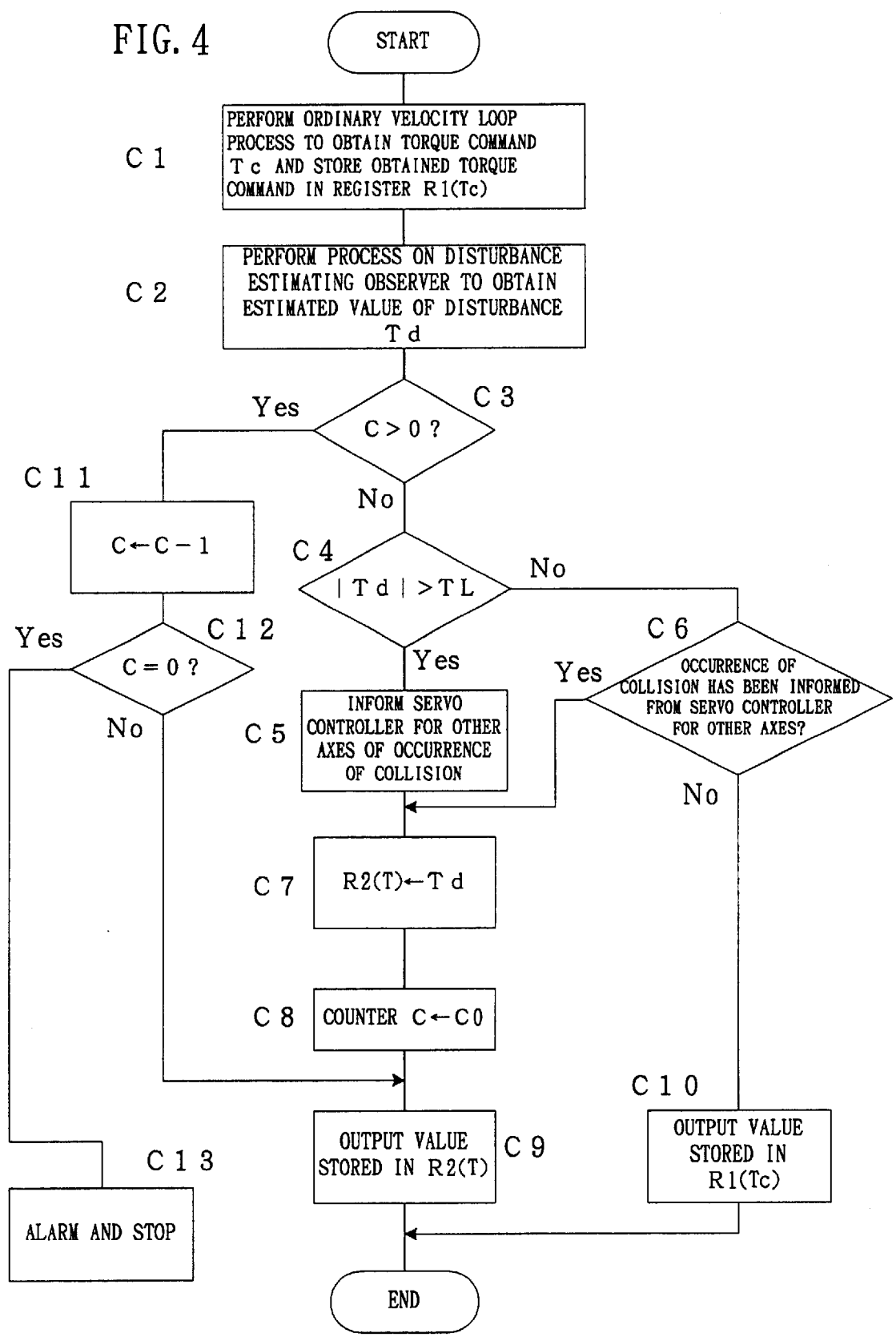
FIG. 4 is a flowchart of a process to be performed by the processor in a servo controller for drivingly controlling the servomotor for driving the wrist axis in a second embodiment in each predetermined period.

FIG. 4 is a flowchart of a process which each servo controller for a wrist axis performs in each period of velocity loop process in that alternative embodiment. The sole difference from the process shown in FIG. 2 is that in FIG. 4, when a collision is detected, an estimated value of disturbance Td given by the disturbance estimating observer is entered in the register R2(T) as it is (Step C7), while in FIG. 2, when a collision is detected, the sign of an estimated value of disturbance Td given by the disturbance estimating observer is judged and a value of torque having a predetermined magnitude and the same sign as that of the estimated value of disturbance Td is entered in the register R2(T) (Steps A7, A8). The other steps are the same. The process of controlling servomotors for basic axes, not wrist axes is the same as that shown in FIG. 3.

Thus, when a collision is detected, the estimated value of disturbance given by a disturbance estimating observer is, as it is, used as a torque command for its associated servomotor for a wrist axis. Therefore, after the hand 21 collides with the obstacle 21, the wrist axis is driven in a direction such that the hand 21 recedes from the obstacle 20 as indicated in FIG. 5c to thereby prevent the hand from colliding with the obstacle again.

In the above-described second embodiment, in Step C7, an estimated value of disturbance Td given by the disturbance estimating observer is entered in the register R2(T) as it is. Alternatively, an estimated value of disturbance Td multiplied by a predetermined constant K (K>0) may be entered in the register R2(T).

The threshold TL with which an estimated value of disturbance Td given by the disturbance estimating observer is judged for detecting a collision may be predetermined either to be the same for all the axes or to be different for each axis.

In the present invention, when a robot collides with an obstacle, wrist axes are driven in a direction such that the robot recedes from the obstacle. Therefore, the robot is prevented from colliding with the obstacle again, and various mechanisms and parts of the robot as well as the obstacle with which the robot has collided are prevented from being damaged.

What is claimed is:

1. An industrial robot comprising:
    servomotors for respectively driving robot axes including wrist axes; and
    servo controllers each having a speed loop to drivingly control each of said servomotors,
    wherein when a collision of the robot or an end effector mounted on the robot with an obstacle is detected, the servo controllers for servomotors for driving the wrist axes drive the associated servomotors for a predetermined time period in a direction opposite to the direction of torque generated at the time of the collision.

2. An industrial robot comprising:
    servomotors for respectively driving robot axes including wrist axes; and
    servo controllers each having a speed loop to drivingly control each of said servomotors,
    wherein when a collision of the robot or an end effector mounted on the robot with an obstacle is detected, the servo controllers for servomotors for driving the axes other than the wrist axes stop the associated servomotors and the servo controllers for servomotors for driving the wrist axes drive the associated servomotors for a predetermined time period in a direction opposite to the direction of torque generated at the time of the collision.

3. An industrial robot comprising:
    servomotors for respectively driving robot axes including wrist axes; and
    servo controllers each having a speed loop to drivingly control each of said servomotors,
    wherein when a disturbance torque exerted on any of said servomotors exceeds a predetermined threshold value, the servo controllers for servomotors for driving the wrist axes drive the associated servomotors for a predetermined time period in a direction to reduce the disturbance torque.

4. An industrial robot according to claim 3, wherein said disturbance torque is estimated by a disturbance torque observer.

5. An industrial robot according to claim 3, wherein the servo controllers for servomotors for driving the wrist axes issue torque commands to the associated servomotors to generate torque in the same direction with that of the disturbance torque.

6. An industrial robot according to claim 5, wherein absolute value of said torque command is predetermined.

7. An industrial robot according to claim 5, wherein said torque command is of the same value with that of said disturbance torque.

8. An industrial robot comprising:

servomotors for respectively driving robot axes including wrist axes; and servo controllers each having a speed loop to drivingly control each of said servomotors, wherein when a disturbance torque exerted on any of said servomotors exceeds a predetermined threshold value, the servo controllers for servomotors for driving the axes other than the wrist axes stop the associated servomotors and the servo controllers for servomotors for driving the wrist axes drive the associated servomotors for a predetermined time period in a direction to reduce the disturbance torque.

9. An industrial robot according to claim 8, wherein said disturbance torque is estimated by a disturbance torque observer.

10. An industrial robot according to claim 8, wherein the servo controllers for servomotors for driving the wrist axes issue torque commands to the associated servomotors to generate torque in the same direction with that of the disturbance torque.

11. An industrial robot according to claim 10, wherein absolute value of said torque command is predetermined.

12. An industrial robot according to claim 10, wherein said torque command is of the same value with that of said disturbance torque.

* * * * *